United States Patent
Tsui et al.

(10) Patent No.: US 10,786,110 B2
(45) Date of Patent: Sep. 29, 2020

(54) PORTABLE HEATING ROD

(71) Applicant: LUCKY CONSUMER PRODUCTS LIMITED, Hong Kong (HK)

(72) Inventors: Nam Tsui, Hong Kong (HK); Chi Keung Chow, Tai Nan (TW)

(73) Assignee: LUCKY CONSUMER PRODUCTS LIMITED, Hong Kong (CN)

( * ) Notice: Subject to any disclaimer, the term of this patent is extended or adjusted under 35 U.S.C. 154(b) by 290 days.

(21) Appl. No.: 15/703,671

(22) Filed: Sep. 13, 2017

(65) Prior Publication Data

US 2019/0075960 A1    Mar. 14, 2019

(51) Int. Cl.
| A47J 31/44 | (2006.01) |
| A23L 5/00  | (2016.01) |
| H05B 3/80  | (2006.01) |
| H05B 6/10  | (2006.01) |
| A47J 36/24 | (2006.01) |

(52) U.S. Cl.
CPC .............. *A47J 31/44* (2013.01); *A23L 5/00* (2016.08); *A47J 36/2433* (2013.01); *A47J 36/2483* (2013.01); *H05B 3/80* (2013.01); *H05B 6/108* (2013.01); *A23V 2002/00* (2013.01); *H05B 2203/032* (2013.01)

(58) Field of Classification Search
None
See application file for complete search history.

(56) References Cited

U.S. PATENT DOCUMENTS

| 1,445,501 A | * | 2/1923 | Dwinall | .................. H05B 3/78 |
| | | | | 392/443 |
| 2,483,979 A | * | 10/1949 | Morrill | ............... A47J 36/2433 |
| | | | | 219/437 |
| 2,512,284 A | * | 6/1950 | Mumford | ................ A47J 36/30 |
| | | | | 126/261 |

(Continued)

FOREIGN PATENT DOCUMENTS

| CN | 202068601 U | 12/2011 |
| CN | 202445739 U | 9/2012 |

(Continued)

OTHER PUBLICATIONS

International Search Report and Written Opinion of PCT application No. PCT/CN2018/093602 issued from the International Search Authority dated Aug. 23, 2018.

(Continued)

*Primary Examiner* — Thor S Campbell
(74) *Attorney, Agent, or Firm* — Spruson & Ferguson (Hong Kong) Limited

(57) ABSTRACT

Provided is a portable heating rod for heating a beverage in a container and a method of using the same. The portable heating rod comprises a handle portion and a heating portion coupled to the handle portion along a longitudinal direction. The handle portion includes a first housing made of a heat insulating material, a control interface, a control circuit board and a power source within the first housing. The heating portion includes a second housing made of a heat conductive material, at least one heating element and at least one temperature sensor. During operation, the heating portion of the portable heating rod is at least partly immersed in the beverage.

13 Claims, 5 Drawing Sheets

(56) References Cited

U.S. PATENT DOCUMENTS

| | | | | |
|---|---|---|---|---|
| 2,918,561 A * | 12/1959 | Perez | A47J 37/00 219/523 | |
| 3,432,641 A | 3/1969 | Welke | | |
| 3,536,893 A * | 10/1970 | Cranley | H05B 3/80 219/523 | |
| 3,769,493 A | 10/1973 | Zeitlin et al. | | |
| 4,065,660 A * | 12/1977 | Berard | A47J 36/2433 219/535 | |
| 4,108,181 A * | 8/1978 | Saliaris | A61B 18/10 219/233 | |
| 4,563,570 A * | 1/1986 | Johns | A61B 18/082 219/233 | |
| 4,857,702 A * | 8/1989 | Cafaro | A45D 1/04 219/225 | |
| 5,025,130 A * | 6/1991 | Slone | B60H 1/00264 219/203 | |
| 5,118,927 A * | 6/1992 | Eisenhauer | A47J 36/2433 165/132 | |
| 5,337,581 A * | 8/1994 | Lott | A61L 11/00 220/87.1 | |
| 5,408,068 A * | 4/1995 | Ng | H05B 3/36 219/202 | |
| 5,436,429 A * | 7/1995 | Cline | A47J 36/2433 219/202 | |
| 5,568,587 A | 10/1996 | Marioni | | |
| 5,706,390 A * | 1/1998 | O'Neil | A47J 27/21158 392/497 | |
| 6,497,441 B1 * | 12/2002 | Mahmood | B60N 2/2854 224/400 | |
| 6,588,821 B2 * | 7/2003 | Worrell | B60N 2/26 224/275 | |
| 6,744,978 B2 | 6/2004 | Tweedy et al. | | |
| 7,196,293 B2 * | 3/2007 | Britto | H01R 13/7038 219/387 | |
| 8,561,462 B2 * | 10/2013 | Arnold | G01F 23/0053 73/301 | |
| 10,187,929 B1 * | 1/2019 | McFadden | H05B 3/06 | |
| 2016/0037956 A1 | 2/2016 | Wu | | |
| 2017/0245678 A1 | 8/2017 | Wakeham et al. | | |

FOREIGN PATENT DOCUMENTS

| | | |
|---|---|---|
| CN | 203074328 U | 7/2013 |
| CN | 203104818 U | 7/2013 |
| CN | 203987345 U | 12/2014 |
| CN | 107404772 A | 11/2017 |
| CN | 206775762 U | 12/2017 |
| WO | 2006040540 A1 | 4/2006 |

OTHER PUBLICATIONS

Extended European search report of EP18855639 issued from the European Patent Office dated May 20, 2020.

* cited by examiner

PORTABLE HEATING ROD

FIELD OF THE INVENTION

The present disclosure generally relates to a portable heating device and, in particular, to an immersion heating rod with inbuilt battery.

BACKGROUND OF THE INVENTION

There is a constant need for hot, warm or cool water or beverage for outdoor use. For instance, a mother may need hot or warm water to brew milk or to warm up breast milk kept in cold storage for feeding a baby; an outdoorsman may need hot or warm water to brew coffee or to cook instant noodles. A traditional solution to this problem is to bring hot water in a vacuum container. However, the vacuum container adds weight to package and the hot water will cool down in a few hours. Hence, it is desirable to have a portable heater that is compact, lightweight and easy to use.

As a portable heater for outdoor use, it is usually necessary to incorporate a power source, because an external power supply is usually not available. A traditional solution is a portable cooker using fuel gas. However, such portable cooker and fuel gas are inconvenient to carry or use. A power source such as a battery is more convenient to use compared with a fuel gas. However, the battery usually takes up a lot of space, making the heater bulk Another issue for a portable heater with battery is safety. A battery should generally be kept away from a heater to avoid the possible risk of explosion. This increases the difficulty of integrating a battery into a portable heater.

SUMMARY OF THE INVENTION

A need therefore exists for a portable heater that eliminates or diminishes at least some of the disadvantages and problems described above.

In certain embodiments, the present disclosure relates to a portable heating rod for heating a beverage in a container, the portable heating rod comprises a handle portion and a heating portion coupled to the handle portion along a longitudinal direction, the handle portion includes a first housing made of a heat insulating material; a control interface; and a control circuit board, the heating portion includes a second housing made of a heat conductive material; a power source within the second housing; at least one heating element and at least one temperature sensor, wherein the control circuit board is in electrical communication with the control interface, the power source, the at least one heating element and the at least one temperature sensor, such that control signals from the control interface can be transmitted to control the at least one heating element, and temperature signals from the at least one temperature sensor can be transmitted to be displayed at the control interface, wherein during operation, the heating portion of the portable heating rod is at least partly immersed in the beverage.

In certain embodiments, the handle portion further includes a power interface in electrical communication with the control circuit, such that the power source can be driven or rechargeable by an external power source through the power interface.

In certain embodiments, the control interface is a touch screen.

In certain embodiments, the heating portion further includes at least one heat insulator for insulating the at least one heating element from the at least one temperature sensor and/or the power source.

In certain embodiments, the at least one heat insulator is disposed at the proximal end and/or the distal end of the at least one heating element along the longitudinal direction.

In certain embodiments, the heating portion further includes at least one heat conductor for transferring heat from the at least one heating element to the second housing.

In certain embodiments, the at least one heat conductor is disposed around the at least one heating element and between the at least one heating element and the second housing.

In certain embodiments, the heating portion comprises a first one or more temperature sensor adjacent the at least one heating element.

In certain embodiments, the heating portion comprises a second one or more temperature sensor at the distal end of and in contact with the second housing.

In certain embodiments, the at least one heating element, the at least one heat insulator and the at least one heat conductor are disposed near the distal end of the heating portion, and the power source is disposed proximal to the at least one heating element, the at least one heat insulator and the at least one heat conductor.

In certain embodiments, the portable heating rod further comprises an engaging means for securing the portable heating rod to the container.

In certain embodiments, the present disclosure relates to a method of heating a beverage in a container with the aforementioned portable heating rod, the method comprises the steps of: turning on the portable heating rod by interacting with the control interface in a first pattern; measuring a beverage temperature and displaying the measured beverage temperature at the control interface; activating a heating mode where the at least one heating element heats up the beverage by interacting with the control interface in a second pattern; deactivating the heating mode and activating a warm-keeping mode where the at least one heating element keeps the beverage at a temperature by interacting with the control interface in a third pattern; and turning off the portable heating rod by interacting with the control interface in a fourth pattern.

In certain embodiments, the control interface displays different colors in accordance with different measured beverage temperatures.

In certain embodiments, the method further comprises the step of recording a user customized temperature as warm-keeping temperature by interacting with the control interface in a fifth pattern, such that when the beverage is heated up to the warm-keeping temperature, the portable heating rod is switched automatically from the heating mode to the warm-keeping mode.

In certain embodiments, the first pattern, the second pattern, the third pattern, the fourth pattern and the fifth pattern are selected from a group consisting of short tapping for once, short tapping for twice, short tapping for more than twice, long tapping for a period of 1 second, long tapping for a period of 2 seconds, long tapping for a period of 3 seconds, and long tapping for a period of more than 3 seconds.

BRIEF DESCRIPTION OF THE DRAWINGS

The appended drawings contain figures to further illustrate and clarify the above and other aspects, advantages and features of the present disclosure. It will be appreciated that these drawings depict only certain embodiments of the present disclosure and are not intended to limit its scope. It will also be appreciated that these drawings are not necessarily depicted to scale. The present disclosure will now be described and explained with additional specificity and detail through the use of the accompanying drawings in which.

DETAILED DESCRIPTION OF THE INVENTION

The present disclosure is generally directed towards a portable heating rod for heating or warming beverage. The principles of the present disclosure, however, are not limited to such use. It will be understood that, in light of the present disclosure, the portable heating rod disclosed herein can also be successfully used, for example, for other heating or warming purposes, such as warming hands and other body parts. The portable heating rod disclosed herein, with a replacing cooling element, can also be successfully used, for example, for cooling purposes.

Additionally, to assist in the description of the structural configuration, words such as longitudinal, proximal, distal, top, bottom and the like are used. A proximal or top end is the upper end when the portable heating rod is being used in an upright position, while the distal or bottom end is the lower end when the portable heating rod is being used in the upright position. Unless their contextual usage indicates otherwise, these words are to be understood herein as having no structural, functional or operational significance and as merely reflecting the arbitrarily chosen orientation.

Structural Configuration

Figure 1:
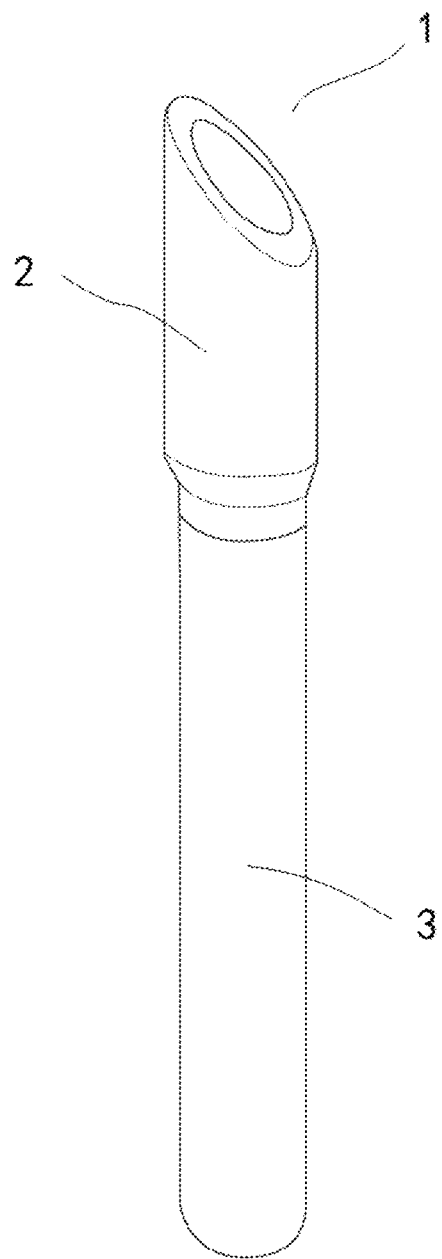
FIG. 1 is a portable heating rod according to certain embodiments of the present disclosure.

As shown in FIG. 1, the portable heating rod 1 of the present disclosure generally has a two-part form, comprising a handle portion 2 and a heating portion 3. Each of the two portions has a tubular shape, so they together form a rod. It is not necessary for the rod to have a consistent diameter along its longitudinal axis. In certain embodiments, the handle portion 2 may have a larger diameter than the heating portion 3. Other suitable shapes and configurations of the portable heating rod 1 are also within the contemplation of the present disclosure. The portable heating rod 1 is sized such that it is suitable for being placed in a container filled with liquid, with the heating portion 3 at least partly immersed in the liquid and the handle portion 2 accessible to a user. Such liquid can be a beverage, such as, milk particularly milk for babies brewed from milk powder or breast milk, coffee, tea or any other beverage that needs to be heated prior to consumption. Such container can be a feeding bottle, a cup, a glass, a teapot or any other portable containers. In certain embodiments, the portable heating rod 1 has an outer diameter of 10 mm to 50 mm, 15 mm to 45 mm, 20 mm to 40 mm, or 25 mm to 35 mm, particularly 12 mm, 14 mm, 16 mm, 18 mm, 22 mm, 24 mm, 26 mm, 28 mm, 30 mm, 32 mm, 34 mm, 36 mm, 38 mm, 42 mm, 44 mm, 46 mm or 48 mm. In certain embodiments, the portable heating rod 1 has a length of 50 mm to 300 mm, 60 mm to 290 mm, 70 mm to 280 mm, 80 mm to 270 mm, 90 mm to 260 mm, 100 mm to 250 mm, 110 mm to 240 mm, 120 mm to 230 mm, 130 mm to 220 mm, 140 mm to 210 mm, 150 mm to 200 mm, 160 mm to 190 mm, or 170 mm to 180 mm, particularly 55 mm, 65 mm, 75 mm, 85 mm, 95 mm, 105 mm, 115 mm, 125 mm, 135 mm, 145 mm, 155 mm, 165 mm, 175 mm, 185 mm, 195 mm, 205 mm, 215 mm, 225 mm, 235 mm, 245 mm, 255 mm, 265 mm, 275 mm, 285 mm, or 295 mm. In certain embodiments, the ratio between the length of the handle portion 2 and the length of the heating portion 3 is 1:10, 1:9; 1:8, 1:7, 1:6, 1:5, 1:4, 1:3, or 1:2.

The handle portion 2 comprises a first housing 21 that is made from a heat insulating material. In certain embodiments, the first housing 21 of the handle portion 2 is made from plastic, ceramic or a combination thereof. The heating portion 3 comprises a second housing 31 that is made from a heat conductive material. The heat conductive material must also be a food grade material, meaning the material does not contaminate food with harmful materials on coming in direct contact or lying nearby. In certain embodiments, the second housing 31 of the heating portion 3 is made from Titanium, stainless steel or a combination thereof. In certain embodiments, the second housing 31 is formed as one integral piece.

Figure 2:
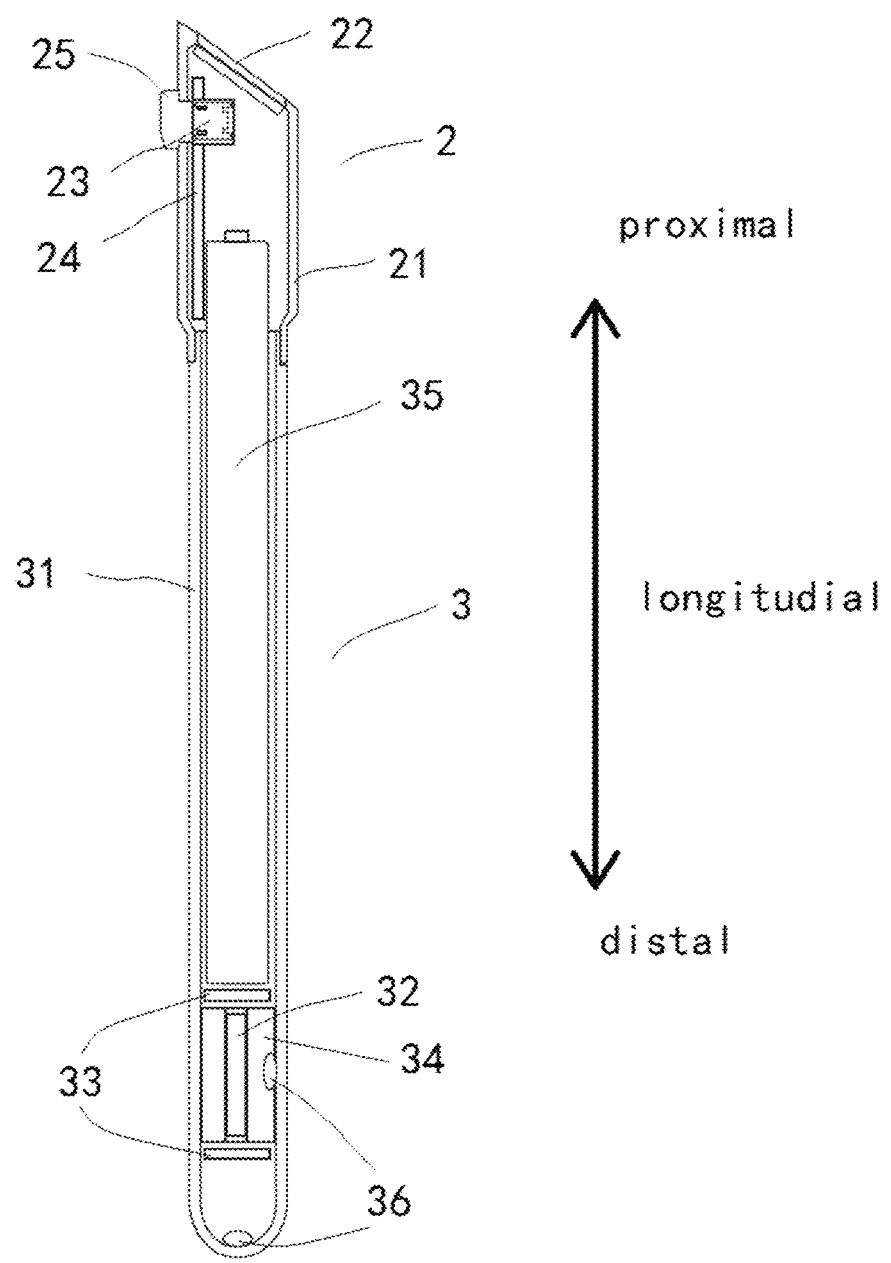
FIG. 2 is a section view of a portable heating rod according to certain embodiments of the present disclosure.

The handle portion 2 and the heating portion 3 are coupled to each other as shown in FIG. 2. In certain embodiments, the handle portion 2 can be clamped, snap-fit, screwed, glued, thermally bonded or coupled by any other means known in the art to the heating portion 3. In certain embodiments, the handle portion 2 is coupled to the heating portion 3 in a watertight manner, so that liquid or vapor cannot get into the internal space of the handle portion 2 or the heating portion 3 through the interface therebetween. In certain embodiments, a distal end of the first housing 21 of the handle portion 2 is coupled onto a proximal end of the second housing 31 of the heating portion 3. A seal can be provided therebetween. The seal can be a seal ring, a labyrinth seal, a contact seal, or any other type of seal known in the art.

The first housing 21 of the handle portion 2 defines an internal space and various components of the portable heating rod 1 can be disposed on or within the first housing 21. In certain embodiments, the handle portion 2 can further comprise a control interface 22 at the first housing 21 of the handle portion 2. In certain embodiments, the control interface 22 is a touch screen that can be provided at the proximal end or on the top end of the first housing 21 of the handle portion 2. The touch screen 22 receives a user's control signals and displays control information on the touch screen 22. In certain embodiments, the control interface 22 can provide an ordinary screen and physical buttons or switches. Still in certain embodiments, the first housing 21 of the handle portion 2 itself may serve as a control interface 22 to receive a user's instructions, for instance, by rotating (clockwise and/or counterclockwise) and/or translating (proximally and/or distally) the first housing 21 relative to the second housing 31.

In certain embodiments, the handle portion 2 can further comprise a power interface 23 at the first housing 21. In certain embodiments, the power interface 23 is a USB, mini-USB, micro-USB, USB Type-C, Lightening, Thunderbolt, pin or any other power interface known in the art. The power interface 23 receives power input from an external power source (not shown), such as an AC power source, a DC power source, a charger, a power bank, or any other power source that is known in the art. In certain embodiments, the power interface 23 has a sealing means 25 to prevent dusts, liquid, vapor or any other undesired contaminant from getting into the power interface 23 and the internal space of the handle portion 2. In certain embodiments, the sealing means 25 can be detached from the power interface 23 while the power interface 23 is connected to air external device, and re-attached to and seal the power interface 23 after the connection is disconnected.

In certain embodiments, the power interface 23 can also serve as a data interface. The date interface 23 allows data communication of the portable heating rod 1 with an external computing device (not shown), such as a personal computer, a laptop, a cell phone, or any other computing device known in the art. This data communication can allow, for instance, updating the software or firmware of the portable heating rod 1, downloading user configured profiles, or uploading analytics, diagnostics and usage information. In certain embodiments, the data interface is different from the power interface 23. For example, the data interface can be a wireless interface, such as, Bluetooth, ZigBee, NFC, or any other protocols known in the art.

In certain embodiments, the handle portion 2 can further comprise a control circuit board 24 within the first housing 21. The control circuit board 24 is configured to be in electrical communication with the control interface 22, the power interface 23, and the data interface if any. In certain embodiments, the control circuit board 24 receives control signals from the control interface 22, interprets and relays such control signals to other appropriate components of the portable heating rod 1, such as a heating element discussed herein; the control circuit board 24 further feeds control information, such as, operation mode, power source status, temperature, back to the control interface 22 for display. In certain embodiments, the control circuit board 24 receives power input from the power interface 23, transforms if necessary and relays such power input to other appropriate components of the portable heating rod 1, such as a battery discussed herein. In certain embodiments, the control circuit board 24 receives data input from the data interface, interprets and relays such data to other appropriate components of the portable heating rod 1, such as the control interface 22 discussed herein. In certain embodiments, the control circuit board 24 comprises a memory (not shown) for storage of firmware, software, user profiles, user instructions and/or any other suitable data.

Figure 3:
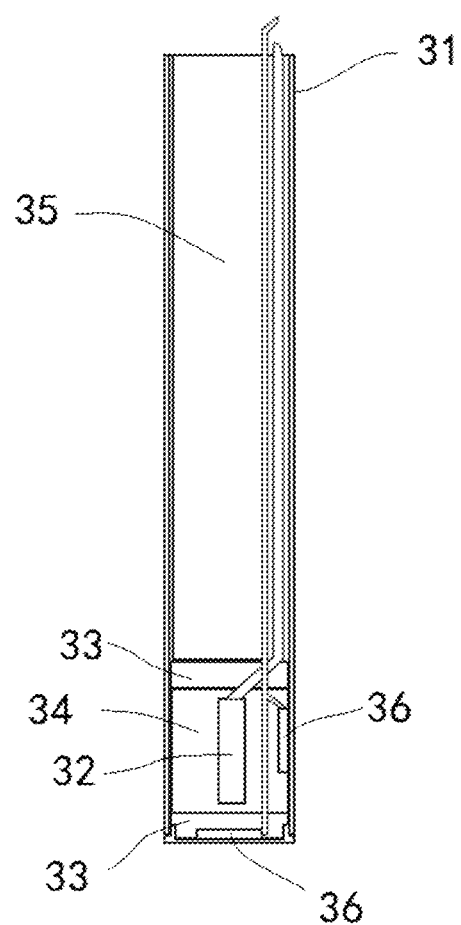
FIG. 3 is a section view of a distal part of a portable heating rod according to certain embodiments of the present disclosure.

The second housing 31 of the heating portion 3 defines an internal space and various components of the portable heating rod 1 can be disposed on or within the second housing 31. In certain embodiments, the heating portion 3 can further comprise at least one heating element 32 within the second housing 31 of the heating portion 3. The at least one heating element 32 is disposed at the proximity of the distal end of the heating portion 3. This has the advantage that when the portable heating rod 1 is immersed in the beverage of a container, the at least one heating element 32 is likely to be below the water level of the beverage, whether the container is full, half full or even less. It also has the advantage of leaving a large internal space at the proximal portion of the second housing for other use, such as for accommodating a battery. In certain embodiments, the at least one heating element 32 is a resistance heater, an electromagnetic heater, an infrared heater, or any other types of heater known in the art. In certain embodiments, the at least one heating element 32 is a cooler, such as a Peltier element. In certain embodiments, the at least one heating element 32 is heat insulated along the longitudinal direction. This can be provided by at least one heat insulator 33 placed at the proximal end and/or the distal end of the at least one heating element 32. The at least one heat insulator 33 can extend across substantially the entire cross-section of the internal space of the second housing. The at least one heat insulator 33 reduces or prevents heat transfer from the at least one heating element 32 along the longitudinal direction, proximally and/or distally. In certain embodiments, the at least one heating element 32 is in thermal communication with the second housing 31 in the transverse direction. The thermal communication is provided by at least one heat conductor 34 around substantially the entire circumference of the at least one heating element 32 and between the second housing 31 and the at least one heating element 32. In certain embodiments as shown in FIG. 3, the at least one heat conductor 34 fills the entire space between the at least one heat insulator 33 at the proximal end of the at least one heating element 32 and the at least one heat insulator 33 at the distal end of the at least one heating element 32 within the second housing. The at least one heat conductor 34 facilitates or enhances heat transfer from the at least one heating element 32 to the second housing 31 of the heating portion 3 transversely. As such, a preferential heat transfer pathway is established transversely. A significant portion of heat generated by the at least one heating element 32 is transferred to the part of the second housing 31 of the heating portion 3 at the same longitudinal position with the at least one heating element 32. This part of the second housing 31 has the highest temperature (i.e. the most heat) and is in direct contact with beverage of a container to heat the beverage. A portion of heat is also transferred along the second housing 31 from the part of the second housing 31 at the same longitudinal position with the at least one heating element 32, both proximally and distally, to the remaining parts of the second housing 31. As most of the remaining part of the second housing 31 is also in direct contact with the beverage of the container, the heat will be transferred to heat up the beverage. On the other hand, only a very small or negligible portion of heat generated by the at least one heating element 32 is transferred within the second housing 31 along the longitudinal direction, such that the impact of heat from the at least one heating element 32 to components within the second housing 31 proximal or distal to the at least one heating element 32 (e.g. the battery and the temperature sensor as discussed herein) can be minimized. In this way, the battery remains at a safe-to-operate temperature even it is incorporated in the portable heating rod 1 of the present disclosure. A compact portable heating rod 1 with inbuilt battery is therefore possible without having a safety issue. Likewise, the measurement of the temperature sensor is not directly affected by heat from the at least one heating element and thus a more accurate measurement of beverage temperature can be obtained.

The at least one heat insulator 33 can be a foam material, a glass fiber, a aerogel blanket, a vacuum plate, any other heat insulating material or structure known in the art, or a combination thereof. The at least one heat conductor 34 can be a metal, a graphene, a silicone grease, a cooling oil, any other heat conducting material or structure known in the art, or a combination thereof.

In certain embodiments, the second housing 31 is formed from at least two different materials. The part of the second housing 31 at the same longitudinal position with the at least one heating element 32 is made of a heat conductive material, while the remaining parts of the second housing 31 is made of a heat insulation material.

In certain embodiments, the heating portion 3 can further comprise a power source 35. The power source 35 is in electrical communication with the control circuit board 24 of the handle portion 2, such that power input from an external power source through the power interface 23 can be used to drive or charge the power source 35. A majority or the whole of the power source 35 is accommodated within the second housing 31 proximal to the at least one heating element 32. In certain embodiments, the power source 35 has a rod shape and a cross-sectional dimension slightly smaller than that of the internal space defined by the second housing 31, so that the power source 35 can take up most internal space within the second housing 31 proximal to the at least one heating element 32. A larger power source usually means a larger power capacity and longer use time for the portable heating rod 1. By incorporating the power source 35 into second housing 31, the present disclosure is able to provide a very compact portable heating rod 1. However, other shapes and dimensions of the power source 35 are also within the contemplation of the present disclosure. As discussed earlier, the at least one heat insulator 33 reduces or prevents heat transfer from the at least one heating element 32 along the longitudinal direction proximally. As such, the power source 35 is heat insulated from the at least one heating element 32 by the at least one heat insulator 33. These add to the safety of the power source 35 even it is placed near the at least one heating element 32 and may be partly below the water level of the beverage being heated. In certain embodiments, additional heat insulators (not shown) can be provided to heat insulate the power source 35 from the surrounding part of the second housing 31. In certain embodiments, the additional heat insulators enclose the power source 35 along a substantial or entire length of the power source 35 in the longitudinal direction to isolate it from heat.

The power source 35 can be a replaceable battery, such as a AA or AAA battery, or a rechargeable battery, such as a Ni—Cd rechargeable battery, a Ni-MH rechargeable battery, a Li-ion rechargeable battery, a Li-polymer rechargeable battery, or any other type of rechargeable battery known in the art. In certain embodiments, the power source 35 is a specifically designed LiHV rechargeable battery. The rechargeable battery 35 is configured to be stable in spite of the heat generated by the at least one heating element 32, the rechargeable battery 35 itself and any other power consuming elements of the portable heating rod 1. In certain embodiments, the rechargeable battery 35 is provided with a protection means (not shown) to cut off the power when there is any short circuit and/or when the battery 35 has reached an unsafe temperature or status. In certain embodiments, the protection means can be integrated with the control circuit board 24.

In certain embodiments, the heating portion 3 can further comprise at least one temperature sensor 36. The at least one temperature sensor 36 is in electrical communication with the control circuit board 24 of the handle portion 2, such that the measured temperature can be communicated to the control circuit board 24 for feedback control. In certain embodiments, a first one or more temperature sensor 36 of the at least one temperature sensor 36 can be provided adjacent to the at least one heating element 32 to monitor the temperature of the at least one heating element 32. For instance, the first one or more temperature sensor 36 can be embedded in the at least one heat conductor 34 as shown in FIG. 3. In certain embodiments, a second one or more temperature sensor 36 of the at least one temperature sensor 36 can be provided to monitor the temperature of the beverage being heated, or the temperature of the second housing 31 which is presumed to be the temperature of the beverage being heated. The second one or more temperature sensor 36 can be disposed, for instance, at the distal end or on the bottom) of the second housing 31, along the second housing 31 in the longitudinal direction, or a combination thereof. In certain embodiments, the second one or more temperature sensor 36 are within and in direct contact with the second housing 31, embedded in the at least one heat insulator 36 at the distal end of the second housing 31 as shown in FIG. 3, or the second one or more temperature sensor 36 can at least partly protrude out of the second housing 31. As discussed earlier, the at least one heat insulator 33 reduces or prevents heat transfer from the at least one heating element 32 along the longitudinal direction distally. As such, the at least one temperature sensor 36 is heat insulated from the at least one heating element 32 by the at least one heat insulator 33, and the measurement is not directly affected.

Figure 4:
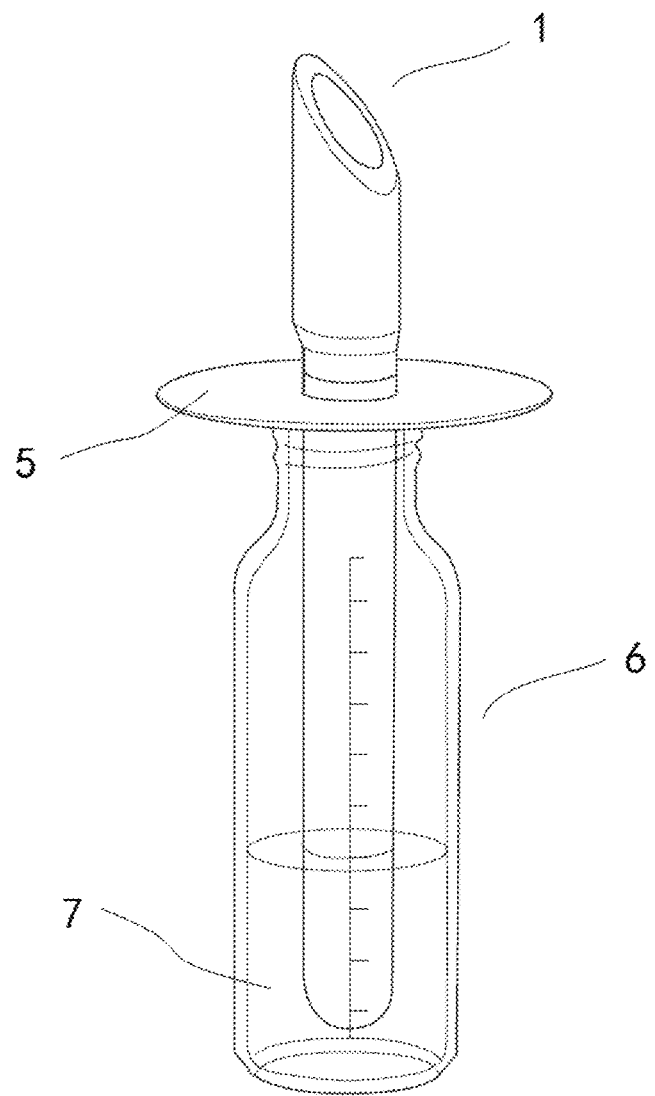
FIG. 4 is a portable heating rod according to certain embodiments of the present disclosure coupled to a container by means of an engaging means according to certain embodiments of the present disclosure.

In certain embodiments, the portable heating rod 1 can be placed within a container and rests toward a rim of the container. Alternatively, the heating portion 3 can further comprise an engaging means 5. The engaging means 5 helps secure the portable heating rod 1 to the container 6 with beverage. This is especially helpful where it is desirable to avoid direct contact between the container 6 and the second housing 31 of the heating portion 3, e.g. where the container 6 is made of a plastic having a relatively low melting point. The engaging means 5 can be a part of the first housing 21 or can be removably coupled to the portable heating rod 1 and to the container 6. In certain embodiments, the engaging means 5 is a disc that can rest on the bottleneck of the container 5 and has a center opening for hanging the portable heating rod 1 therethrough into the beverage 7, as shown in FIG. 4. As the handle portion 2 can have a larger diameter than the heating portion 3 of the portable heating rod 1, the opening of the disk 5 is sized to hold the handle portion 2. The engaging means 5 can also be, for example, a clip, a magnetic piece, a hanger, or any other means known in the art.

Operating Method

Figure 5:
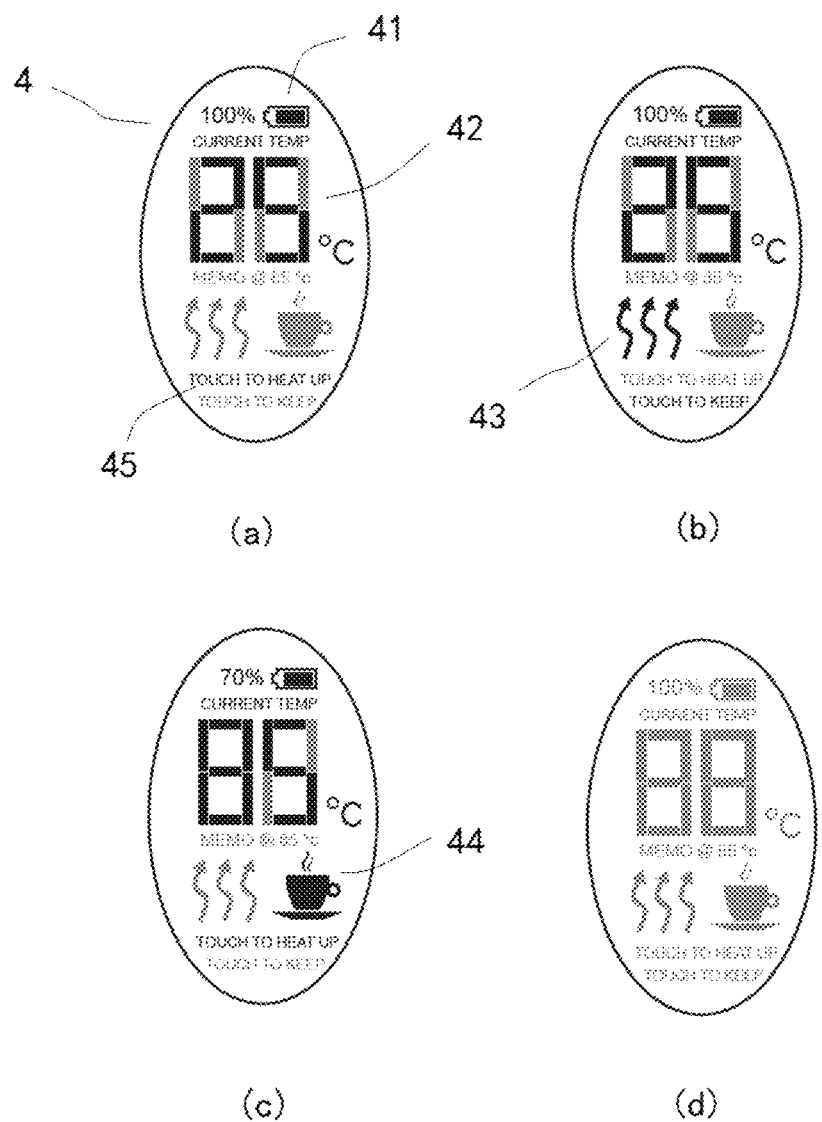
FIG. 5 is an illustration of displays provided by a control interface of a portable heating rod according to certain embodiments of the present disclosure.

The control circuit board 24 and the control interface 22 of the portable heating rod 1 are configured to provide an easy-to-operate user interface. The control interface 22, particularly the touch screen 4 as shown in FIG. 5, allows a user to control the portable heating rod 1, such as, by tapping (e.g. short tapping and long tapping) and/or gestures (e.g. single-point sliding and multi-point sliding). A short tapping is generally a tapping on the touch screen 4 for less than 1 second, while a long tapping is a tapping on the touch screen 4 for more than or equal to 1 second. The short tapping can be further differentiated into tapping for once, twice (i.e. double-click), three times, or four or more times. The long tapping can be further differentiated into tapping for 1 second, 2 seconds, 3 seconds, or 4 or more seconds. The control interface 22, particularly the touch screen 4, also allows a user to monitor the status of the portable heating rod 1, such as, the temperature of the beverage being heated, the operation mode of the portable heating rod 1 (e.g. heating mode or warm keeping mode), the remaining capacity of the battery, whether the battery is being charged, or a combination thereof. In certain embodiments, the touch screen 4 may also display different background colors in accordance with the measured temperature of the beverage. For instance, the touch screen 4 can display a blue background color for a temperature of <35° C.; a green background color for a temperature of 36° C.~45° C.; a yellow background color for a temperature of 46° C.~70° C.; an orange background color for a temperature of 71° C.~85° C.; and a red background color for a temperature of >86° C. Other color patterns are also within the contemplation of the present disclosure. In certain embodiments, the touch screen 4 may also display indications of possible operations, such as, "touch to heat up", "touch to keep warm", or any other similar kinds of indications. In certain embodiments, an audio feedback can also be provided in addition to the visual feedback.

In certain embodiments, the control circuit board 24 enables a user to turn on the portable heating rod 1 as shown in FIG. 5(*a*) by a short tapping on the touch screen 4 for twice. A beverage temperature can be measured and displayed on the touch screen 4. The control circuit board 24 further enables a user to start a heating mode 43 as shown in FIG. 5(*b*) by a short tapping on the touch screen 4 for once, to switch to a warm-keeping mode 44 as shown in FIG. 5(*c*) at the instant temperature by a further short tapping on the touch screen 4 for once, and to turn off the portable heating rod 1 as shown in FIG. 5(*d*) by a long tapping on the touch screen 44 for three seconds. Other control patterns and sequences are also within the contemplation of the present disclosure.

In certain embodiments, the control circuit board 24 enables the portable heating rod 1 to memorize a customized beverage temperature. For instance, this customized beverage temperature can be recoded into the memory of the control circuit board 24 by a long tapping on the touch screen 4 for one second while the portable heating rod 1 is in the warm-keeping mode 44. Likewise, by long tapping on the touch screen 4 a second time for one second, the customized beverage temperature can be cancelled. Once the customized beverage temperature is set, the portable heating rod 1 can heat up the beverage to the temperature in a heating mode 43 and then automatically switch to the warm-keeping mode 44 in future operations. This customized beverage temperature can save a user from monitoring the operation of the portable heating rod 1. This is particularly important for heating breast milk, because overheating may destroy IgG and/or other nutrients therein.

In certain embodiments, the control circuit board 24 enables downloading user configured profiles or remote control through the data interface 23 by a smart phone or other similar device.

In certain embodiments, the control circuit board 24 further enables the portable heating rod 1 to detect burning in an empty state (burning state), e.g. when the portable heating rod 1 is turned on and the at least one heating element 32 is activated accidentally without the heating portion 3 being immersed in a beverage, or when the heating portion 3 of the portable heating rod 1 is not sufficiently immersed in a beverage, or when the beverage has been heated and dried to expose a substantial part of the heating portion 3 of the portable heating rod 1. This burning state can be detected with the aid of the first one or more temperature sensor 36 of the at least one temperature sensor 36 alone or together with the second one or more temperature sensor 36 of the at least one temperature sensor 36. For instance, the burning state can be detected if the first one or more temperature sensor 36 has measured a quick increase in temperature of the at least one heating element 32. This indicates the heat generated by the at least one heating element 32 is not promptly dissipated. Alternatively, the burning state can be detected if the difference between the temperature measured by the first one or more temperature sensor 36 and the temperature measured by the second one or more temperature sensor 36 has exceeded a threshold value. Upon detection of the burning state, the control circuit board 24 is configured to turn off the portable heating rod 1 instantly. Optionally, the control circuit board 24 is also configured to send out visual and/or audio warning.

In certain embodiments, the control circuit board 24 is configured to lower the battery output voltage used to drive the at least one heating element 32 in the warm-keeping mode, to enable energy saving.

One of ordinary skill in the art will appreciate after reviewing this disclosure that the portable heating rod 1 may have other suitable shapes, sizes, configurations and arrangements. Although the present disclosure has been described in terms of certain embodiments, other embodiments apparent to those of ordinary skill in the art are also within the scope of this invention. According the scope of the invention is intended to be defined only by the claims which follow.

What is claimed is:

1. A portable heating rod for heating a beverage in a container, the portable heating rod comprising:
   a handle portion, the handle portion including:
   a first housing made of a heat insulating material;
   a control interface; and
   a control circuit board; and
   a heating portion coupled to the handle portion along a longitudinal direction, the heating portion including:
   a second housing made of a heat conductive material;
   a power source;
   at least one heating element;
   at least one temperature sensor;
   at least one heat conductor; and
   a first heat insulator;
   wherein the power source, the at least one heating element, the at least one temperature sensor, the at least one heat conductor and the first heat insulator are within the second housing;
   wherein the control circuit board is in electrical communication with the control interface, the power source, the at least one heating element and the at least one temperature sensor, such that control signals from the control interface can be transmitted to activate the at least one heating element, and temperature signals from the at least one temperature sensor can be transmitted to be displayed at the control interface;
   wherein during operation, the heating portion of the portable heating rod is at least partly immersed in the beverage;
   wherein the at least one heat conductor is disposed around the at least one heating element and between the at least one heating element and the second housing for transferring heat from the at least one heating element to the second housing, the at least one heat conductor being a metal or a graphene; and
   wherein the first heat insulator extends across a cross-section of the internal space of the second housing, for insulating the at least one heating element and the at least one heat conductor from the power source thereby preventing heat transfer from the at least one heating element and the at least one heat conductor to the power source thereby reducing a risk of explosion of the power source.

2. The portable heating rod of claim 1, wherein the handle portion further includes a power interface in electrical communication with the control circuit, such that the power source can be driven or rechargeable by an external power source through the power interface.

3. The portable heating rod of claim 1, wherein the control interface is a touch screen.

4. The portable heating rod of claim 1, wherein the heating portion further includes a second heat insulator for insulating the at least one heating element from the at least one temperature sensor.

5. The portable heating rod of claim 1, wherein the first heat insulator is disposed at the proximal end or the distal end of the at least one heating element along the longitudinal direction.

6. The portable heating rod of claim 1, wherein the heating portion comprises a first one or more temperature sensor adjacent the at least one heating element.

7. The portable heating rod of claim 1, wherein the heating portion comprises a second one or more temperature sensor at the distal end of and in contact with the second housing.

8. The portable heating rod of claim 1, wherein the at least one heating element, the first heat insulator and the at least one heat conductor are disposed near the distal end of the heating portion, and the power source is disposed proximal to the at least one heating element, the first heat insulator and the at least one heat conductor.

9. The portable heating rod of claim 1, further comprising an engaging means for securing the portable heating rod to the container.

10. A method of heating a beverage in a container with the portable heating rod according to claim 3, comprising the steps of:
- turning on the portable heating rod by interacting with the control interface in a first pattern;
- measuring a beverage temperature and displaying the measured beverage temperature at the control interface;
- activating a heating mode where the at least one heating element heats up the beverage by interacting with the control interface in a second pattern;
- deactivating the heating mode and activating a warm-keeping mode where the at least one heating element keeps the beverage at a temperature by interacting with the control interface in a third pattern; and
- turning off the portable heating rod by interacting with the control interface in a fourth pattern.

11. The method of claim 10, wherein the control interface displays different colors in accordance with different measured beverage temperatures.

12. The method of claim 10, further comprising the step of recording a user customized temperature as a warm-keeping temperature by interacting with the control interface in a fifth pattern, such that when the beverage is heated up to the warm-keeping temperature, the portable heating rod is switched automatically from the heating mode to the warm-keeping mode.

13. The method of claim 12, wherein the first pattern, the second pattern, the third pattern, the fourth pattern and the fifth pattern are selected from a group consisting of short tapping for once, short tapping for twice, short tapping for more than twice, long tapping for a period of 1 second, long tapping for a period of 2 seconds, long tapping for a period of 3 seconds, and long tapping for a period of more than 3 seconds.

* * * * *